United States Patent
Wang (10) Patent No.: US 7,831,120 B2
(45) Date of Patent: Nov. 9, 2010

(54) FILTER DEVICE AND MANUFACTURING METHOD THEREOF

(75) Inventor: Ching-Shiang Wang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 106 days.

(21) Appl. No.: 12/409,703

(22) Filed: Mar. 24, 2009

(65) Prior Publication Data
US 2010/0067851 A1    Mar. 18, 2010

(30) Foreign Application Priority Data
Sep. 12, 2008  (TW) .............................. 97135140 A (51) Int. Cl.
*G02B 6/30* (2006.01)
(52) U.S. Cl. ........................................ 385/51; 385/147
(58) Field of Classification Search ................... 385/50, 385/51, 52, 147
See application file for complete search history.

(56) References Cited

U.S. PATENT DOCUMENTS

| | | | | |
|---|---|---|---|---|
| 4,806,289 A | * | 2/1989 | Laursen et al. | 264/1.29 |
| 6,099,135 A | * | 8/2000 | Oda et al. | 362/620 |
| 6,219,470 B1 | * | 4/2001 | Tu | 385/14 |
| 6,625,350 B2 | * | 9/2003 | Kikuchi et al. | 385/33 |
| 7,043,119 B2 | * | 5/2006 | Takeuchi | 385/33 |
| 7,672,551 B2 | * | 3/2010 | Ji | 385/33 |

* cited by examiner

*Primary Examiner*—Akm E Ullah
(74) *Attorney, Agent, or Firm*—Thomas, Kayden, Horstemeyer & Risley (57) ABSTRACT

A filter device is provided, including a first and second conductor tube and an outside tube. The first light conductor tube includes a first end for light input, a second end including a first slanted assembled end surface coated with a filter, a first tube, and a first light conductor inserted into the first capillary. The second light conductor tube includes a third end for light output, a fourth end including a second slanted assembled end surface, a second capillary, and a second light conductor inserted into the second capillary. The second assembled end of the fourth end is disposed next to and parallel to the first slanted assembled end surface of the second end of the first light conductor tube to coaxially couple to the first light conductor tube. The outside tube is jacketed outside of the first and second light conductor tubes.

19 Claims, 9 Drawing Sheets

FILTER DEVICE AND MANUFACTURING METHOD THEREOF

CROSS REFERENCE TO RELATED APPLICATIONS

This Application claims priority of Taiwan Patent Application No. 097135140, filed on Sep. 12, 2008, the entirety of which is incorporated by reference herein.

BACKGROUND OF THE INVENTION

1. Field of the Invention

The present invention relates to a filter device, and in particular relates to a filter device utilized to filter a light.

2. Description of the Related Art

Figure 1:
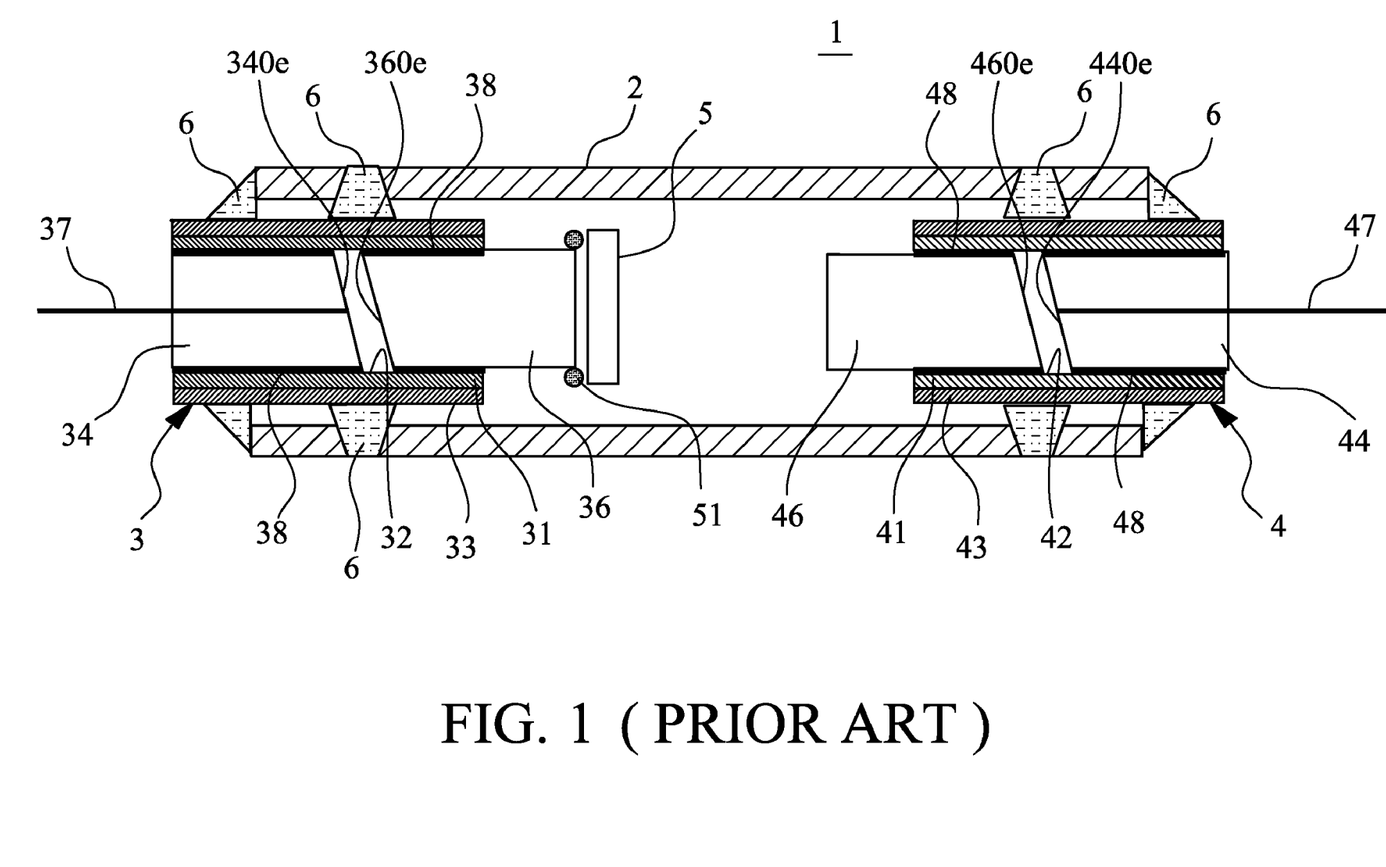
FIG. 1 is a cross section of a conventional filter device.

In FIG. 1, a conventional filter device 1 includes an outer steel pipe 2 for fixation, a first optical fiber aligner 3 disposed in one end of the outer steel pipe 2, and a second optical fiber aligner 4 disposed in the other end of the outer steel pipe 2. The outer steel pipe 2 is provided with a plurality of welding holes, and tin solders 6 applied at the welding holes. The ends of the outer steel pipe 2 are utilized for connecting the outer steel pipe 2 to the first and second optical fiber aligners 3 and 4.

The first optical fiber aligner 3 includes a glass outer tube 31 having an inner hole 32, an outer steel tube 33, an optical guide tube 34 adhered to one end of the inner hole 32 of the glass outer tube 31 by thermosetting glue 38, and a lens 36 provided with a graduated refractive rate. The outer steel tube 33 is jacketed outside of the glass outer tube 31. The optical guide tube 34 includes a slanted end surface 340e, a central hole and an optical fiber 37 disposed in the central hole. The lens 36 having a slanted end surface 360e is adhered to the other end of the inner hole 32 of the glass outer tube 31 by the thermosetting glue 38, and the slanted end surface 360e of the lens 36 is correspondingly spaced from the slanted end surface 340e of the optical guide tube 34.

The structure of the second optical fiber aligner 4 is similar to that of the first optical fiber aligner 3. The second optical fiber aligner 4 includes a glass outer tube 41 having an inner hole 42, an outer steel tube 43, an optical guide tube 44 adhered to one end of the inner hole 42 of the glass outer tube 41 by thermosetting glue 48, and a lens 46 provided with a graduated refractive rate.

The outer steel tube 43 is jacketed outside of the glass outer tube 41. The optical guide tube 44 includes a slanted end surface 440e, a central hole and an optical fiber 47 disposed in the central hole. The lens 46 having a slanted end surface 460e is adhered to the other end of the inner hole 42 of the glass outer tube 41 by the thermosetting glue 48, and the slanted end surface 460e of the lens 46 is correspondingly spaced from the slanted end surface 440e of the optical guide tube 44. The lens 36 of the first optical fiber aligner 3 is closer to the lens 46 of the second optical fiber aligner 4.

A filter 5 is disposed at the end of the lens 36 of the first optical fiber aligner 3 with UV glue 51. The light passing through the first optical fiber aligner 3 is filtered by the filter 5, and then the filtered light with particular wavelengths is collected and transmitted by the second optical fiber aligner 4.

Because the conventional filter device 1 comprises many components and is complicated, the optical guide tube 34, the optical guide tube 44, and the lenses 36 and 46 must be adhered to the glass outer tubes 31 and 41 by the thermosetting glues 38 and 48 when the first and second optical fiber aligners 3 and 4 are respectively assembled. The thermosetting glues 38 and 48 must be first dot-wised applied between the glass outer tubes 31 and 41 and the outer steel tubes 33 and 43 and then dried. Following, the first optical fiber aligner 3 can be adhered to the filter 5 when the assembly of the first optical fiber aligner 3 is completed, and then the outer steel pipe 2 is outwardly disposed on and welded to the first and second optical fiber aligners 3 and 4. However, the welding process sometimes causes damage to the applied thermosetting glues 38 and 48, and therefore the lifespan and reliability of the filter device 1 decreases. Furthermore, due to the long operational hours for the welding process, the cost of the filter device 1 is relatively increased.

BRIEF SUMMARY OF THE INVENTION

To overcome the problems in the conventional filter described above, the invention provides a filter device and manufacturing method thereof with less parts and shortened manufacturing time to increase lifespan and reliability thereof.

The filter device of the invention comprises a first light conductor tube, a second light conductor tube and an outside tube. The first light conductor tube comprises a first end for light input, a second end comprising a first slanted assembled end surface coated with a filter, a first tube, and a first light conductor inserted into the first tube. The second light conductor tube comprises a third end for light output, a fourth end comprising a second slanted assembled end surface, a second tube, and a second light conductor inserted into the second tube, wherein the second assembled end of the fourth end is disposed next to and parallel to the first slanted assembled end surface of the second end of the first light conductor tube to coaxially couple to the first light conductor tube. The outside tube is jacketed outside of the first and second light conductor tubes.

Further, a method for manufacturing a filter device is provided. The filter device comprises a first light conductor tube having a light-inputting end, a second light conductor tube having a light-outputting end and an outside tube. The method comprises the steps of: (A) forming the first light conductor tube and grinding a first assembled end surface thereof into a first slanted surface coated with a filter; (B) forming the second light conductor tube and grinding a second assembled end surface thereof into a second slanted surface having a slanted angle equal to that of the first slanted surface of the first light conductor tube; (C) correspondingly adjusting the first assembled end surface of the first light conductor tube to the second assembled end surface of the second light conductor tube to adjust axiality of the first and second light conductor tubes; (D) bonding the first and second light conductor tubes by an adhesive; and (E) outwardly jacketing the outside tube to the first and second light conductor tubes.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
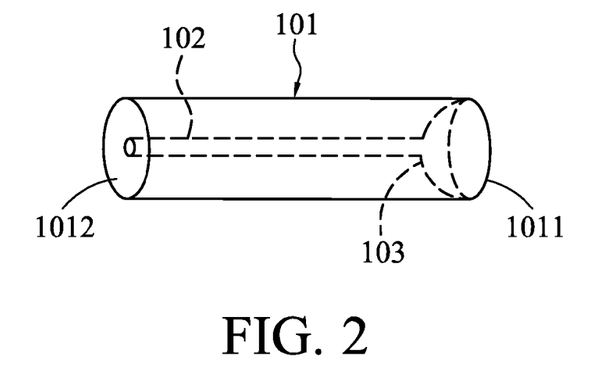
FIG. 2 is a schematic view of the structure of a tube of the embodiment.

In FIG. 2, a capillary 101 is made of glass. The capillary 101 comprises a first end 1011, a second end 1012, a central hole 102 formed therein for disposition of an optical transmission conductor (not shown), and a recess 103 formed at the first end 1011 and connected to the central hole 102. The recess 103 is utilized to guide the optical transmission conductor into the central hole 102, and the optical transmission conductor can be relatively fixed by an adhesive (not shown) disposed in the recess 103 of the capillary 101.

Figure 3:
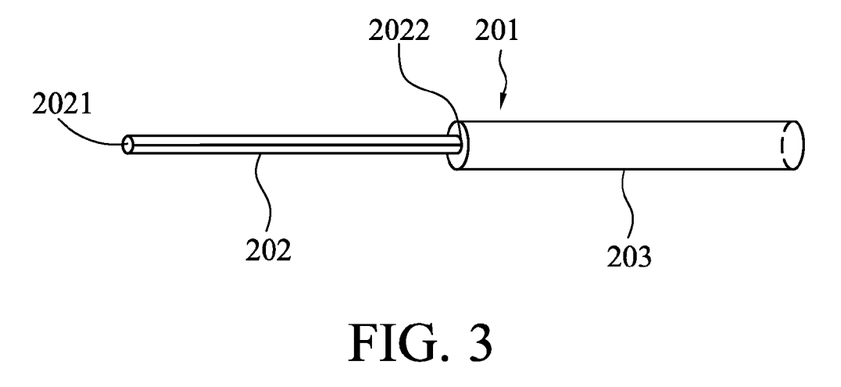
FIG. 3 is a schematic view of the structure of an optical fiber to be connected with the tube of FIG. 2.

In FIG. 3, the optical transmission conductor such as an optical fiber 201 comprises a naked portion 202 and a coated portion 203. The naked portion 202 has a first end 2021 and a second end 2022 connected to the coated portion 203. Due to the diameter of the naked portion 202 of the optical fiber 201 being substantially equal to that of the central hole 102 of the capillary 101, the optical fiber 201 can be fitted to the capillary 101.

Figure 4:
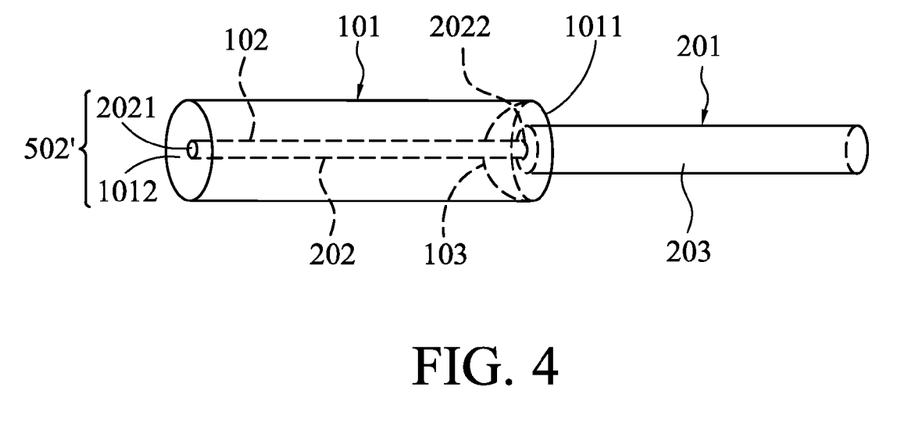
FIG. 4 is a schematic view of the assembled structure of the optical fiber and the tube.

In FIG. 4, after the capillary 101 and the optical fiber 201 are cleaned, the naked portion 202 of the optical fiber 201 is inserted into the central hole 102 of the capillary 101 to be flush the first end 2021 of the naked portion 202 to the second end 1012 of the capillary 101 to form an assembled end surface 502'. The second end 2022 of the naked portion 202 is slightly exposed from the recess 103 of the capillary 101.

Figure 5:
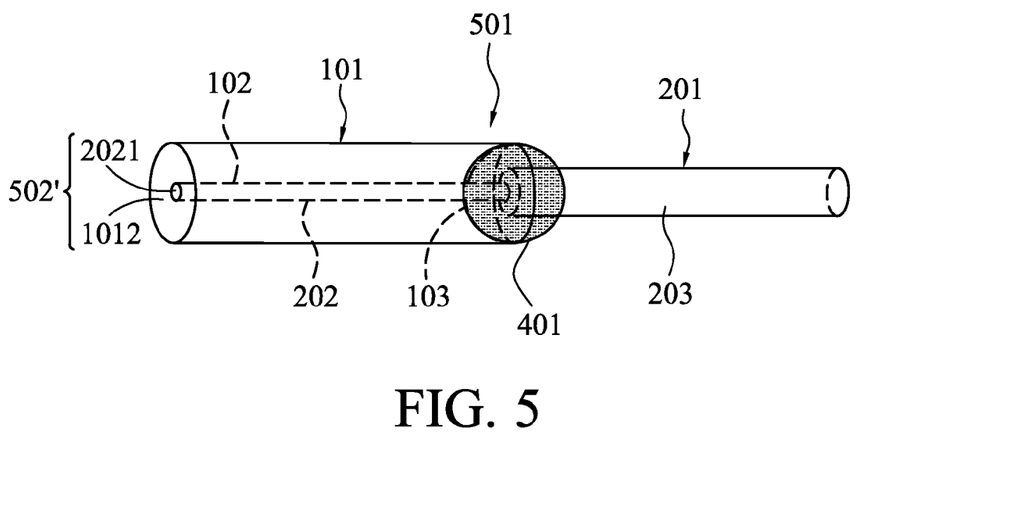
FIG. 5 is a schematic view of a single light conductor tube formed by the optical fiber and the tube structure assembled by dot-wised glue applications.

Referring to FIG. 5, to increase strength of the assembled structure of the capillary 101 and the optical fiber 201, an adhesive such as thermosetting glue 401 is applied in the recess 103 of the capillary 101. When the melted thermosetting glue 401 is applied in the recess 103 of the capillary 101, the melted thermosetting glue 401 is fully oozed into the clearance formed between the capillary 101 and the optical fiber 201. After the thermosetting glue 401 is thermally cured, the optical fiber 201 is fixed in the capillary 101 to form a first light conductor tube or a fiber pigtail 501.

Figure 6:
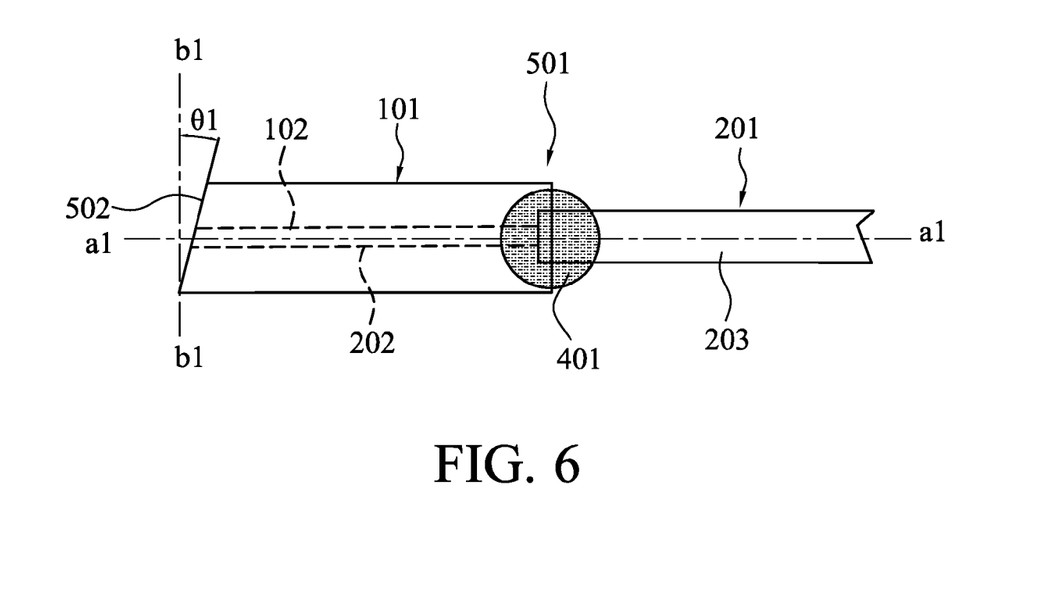
FIG. 6 is a schematic view of the single light conductor tube of FIG. 5 after being grinded.

In FIG. 6, the assembled end surface 502' formed by the first end 2021 of the naked portion 202 and the second end 1012 of the capillary 101 of the first light conductor tube 501 is grinded into a slanted surface 502. A slanted angle θ1 is formed between the slanted assembled end surface 502 and a transverse axis b1-b1 perpendicular to a longitudinal axis a1-a1. The slanted angle θ1 ranges from between 6 to 10 degrees, preferably 8 degrees.

Figure 7:
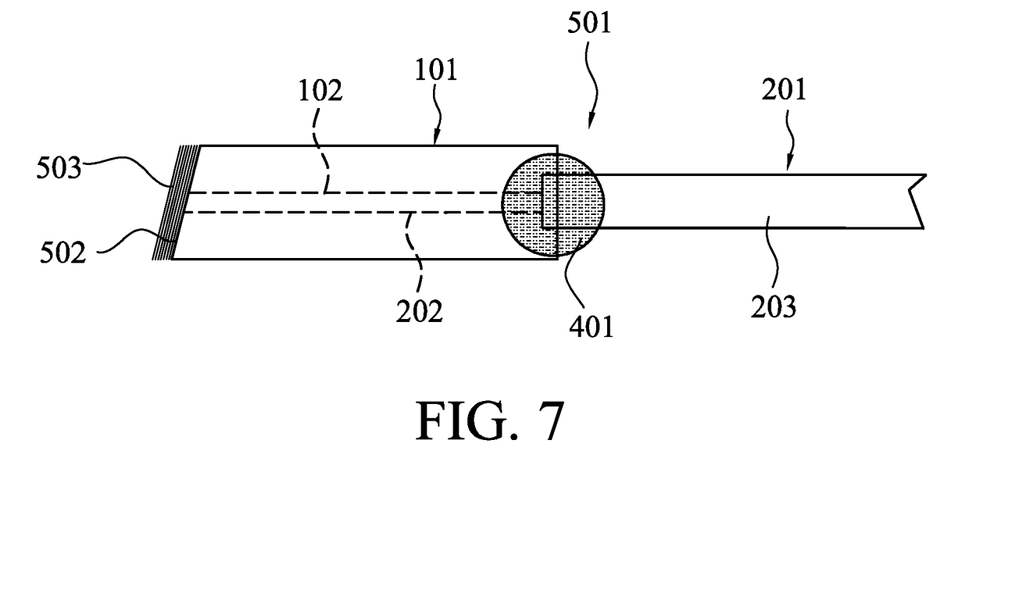
FIG. 7 is a schematic view of a grinded surface of the single light conductor tube after being coated.

In FIG. 7, a filter 503 such as IR cut filter is coated on the slanted assembled end surface 502 of the first light conductor tube 501. In addition, a multilayered with different wavelength bandpass can be coated on the slanted assembled end surface 502 of the first light conductor tube 501. The filter 503 is utilized to filter or integrate incident light, so that a predetermined wavelength such as λ1 is allowed to pass through the filter 503, and light with particular wavelengths such as λ2, λ3 . . . λn is not allowed to pass through the filter 503. Thus, with the filter device of the embodiment, the adhering process of the conventional method can be simplified.

Figure 8:
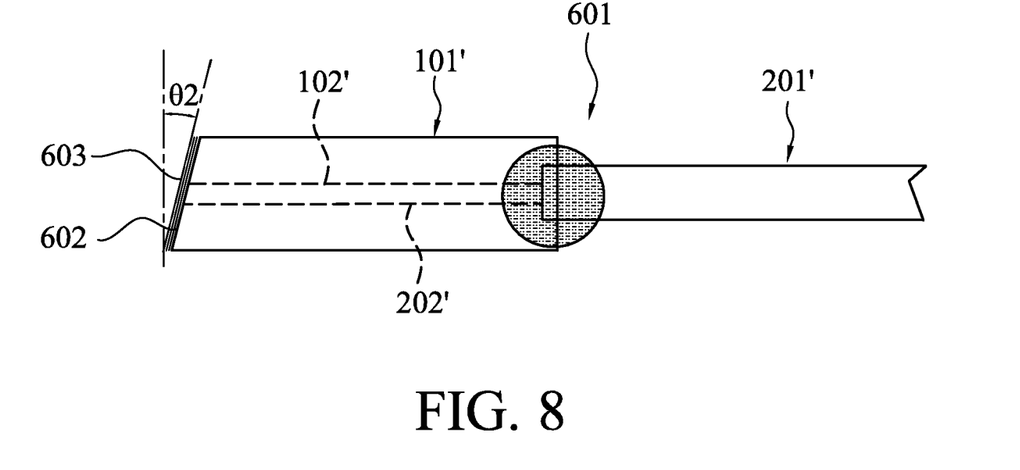
FIG. 8 is a schematic view of another light conductor tube after being coated.

In FIG. 8, a second light conductor tube 601 is formed by the same method as the first light conductor tube 501 shown in FIGS. 2 to 7. The second light conductor tube 601 comprises a capillary 101' and an optical fiber 201'. A slanted assembled end surface 602 formed on the capillary 101' is coated with a anti-reflection coating 603, and a slanted angle θ2 thereof is equal to the slanted angle θ1 of the first light conductor tube 501 in FIG. 6.

Figure 9:
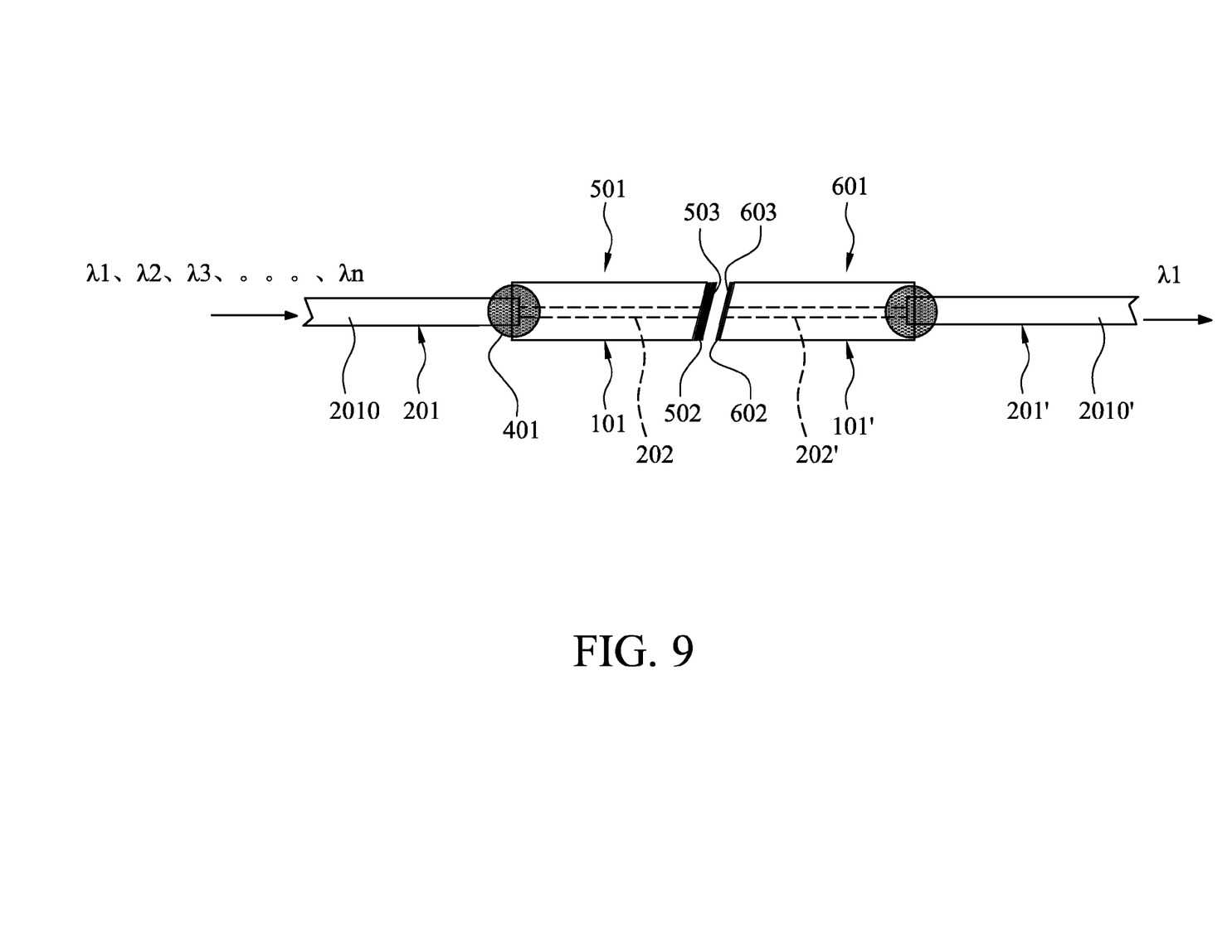
FIG. 9 is a schematic view of two light conductor tubes which are aligned.

In FIG. 9, a light-inputting end 2010 of the capillary 101 of the first light conductor tube 501 is connected to a light source (not shown), and a light-outputting end 2010' of the second light conductor tube 601 is connected to a light-power meter (not shown). A regulating light source emits a light with a wavelength λ1 capable of passing through the filter 503. The first and second light conductor tubes 501 and 601 are disposed on a precise regulating seat (not shown) to make the slanted assembled end surface 502 (hereinafter defined as "first slanted assembled end surface") of the first light conductor tube 501 to face the slanted assembled end surface 602 (hereinafter defined as "second slanted assembled end surface") of the second light conductor tube 601. Thus, the first and second light conductor tubes 501 and 601 can be relatively regulated to align with each other to maximize light power of the light-power meter. Meanwhile, a coaxial degree and a distance of the first and second light conductor tubes 501 and 601 are of preferred values, so that loss thereof can be minimized.

Figure 10:
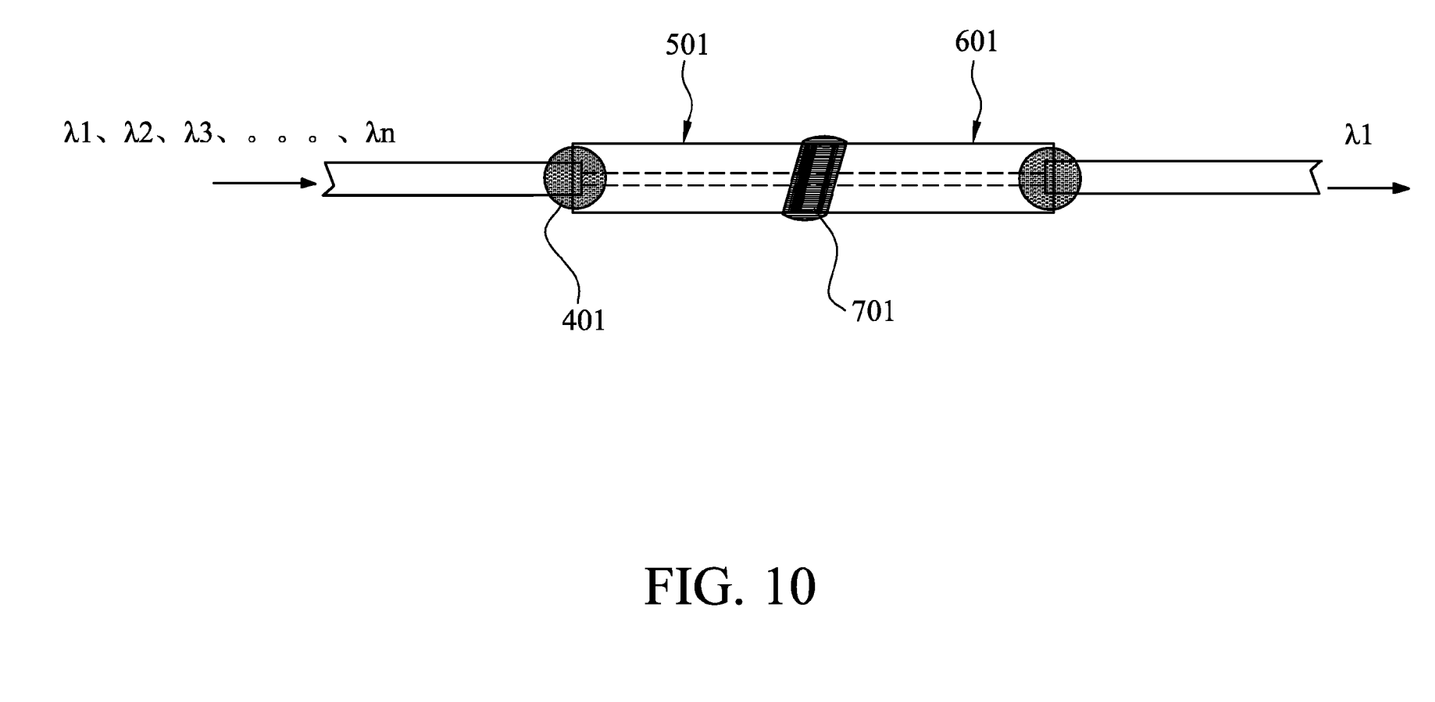
FIG. 10 is a schematic view of two light conductor tubes which are adhered to each other by UV glue.

In FIG. 10, a first adhesive 701 such as UV glue is disposed on a conjunction region of the first and second light conductor tubes 501 and 601, and the first adhesive 701 is cured after being radiated by UV light. The first adhesive 701 is merely applied at a place which is near to the periphery of the first slanted assembled end surface 502 of the first light conductor tube 501 and the second slanted assembled end surface 602 of the second light conductor tube 601. Except for the fixation of the first and second light conductor tubes 501 and 601, the first adhesive 701 is not allowed to ooze to the clearance formed between the first slanted assembled end surface 502 of the first light conductor tube 501 and the second slanted assembled end surface 602 of the second light conductor tube 601, or more particularly, is not allowed to ooze to the naked portions 202 and 202' of the first and second light conductor tubes 501 and 601, and thus high-powered light radiating on the first adhesive 701 and any possible loss caused therefrom can be prevented. Note that the variation of the power value of the light-power meter must be precisely controlled when the first adhesive 701 is applied to the first and second light conductor tubes 501 and 601.

Figure 11:
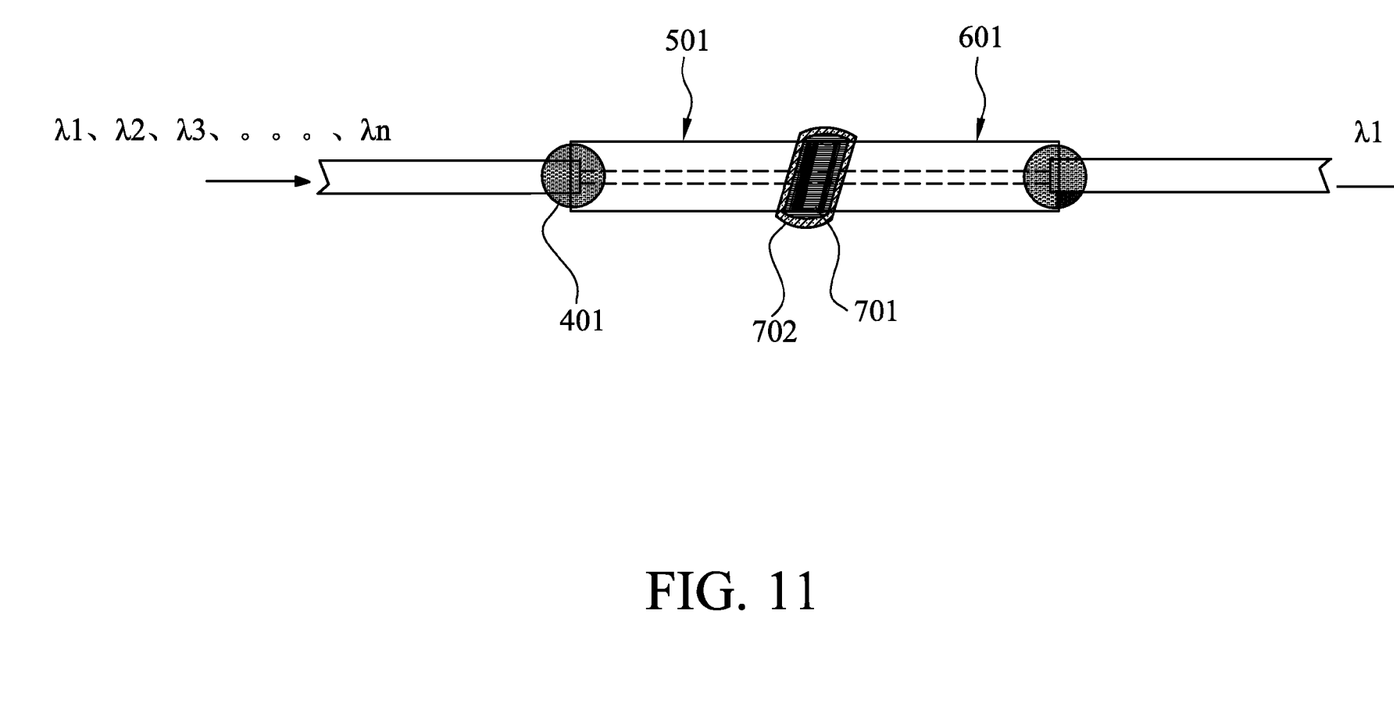
FIG. 11 is a schematic view of two light conductor tubes which are adhered to each other by thermosetting glue.

In FIG. 11, a third adhesive 702 such as thermosetting glue is dot-wised applied to an outside layer of the conjunction region of the first and second light conductor tubes 501 and 601 and then is baked by an oven (not shown), thereby increasing strength of the structure of the first and second light conductor tubes 501 and 601 and preventing moisture.

Figure 12:
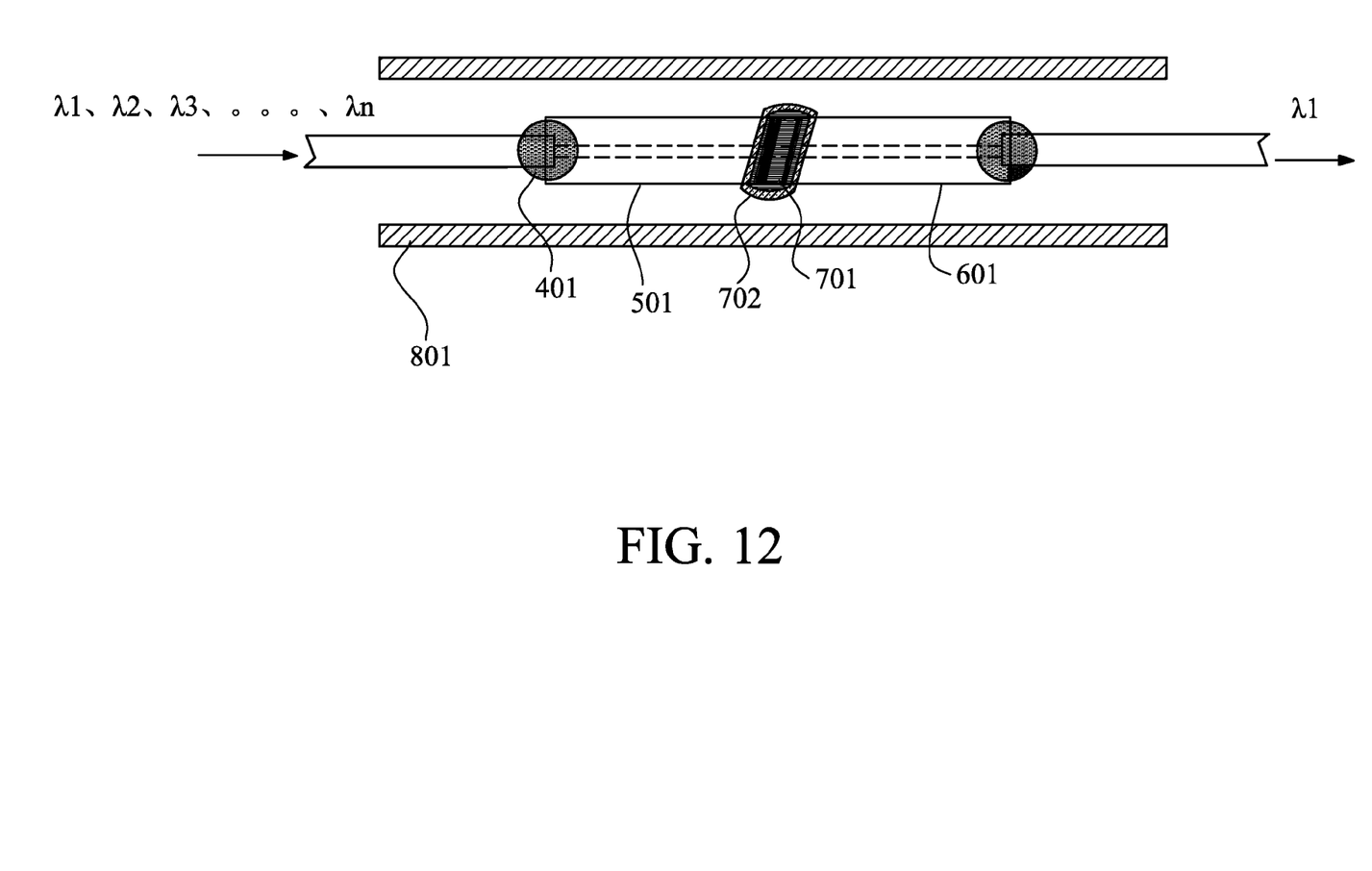
FIG. 12 is a schematic view of the assembled light conductor tubes of FIG. 11, disposed in a metallic outside tube.
Figure 13:
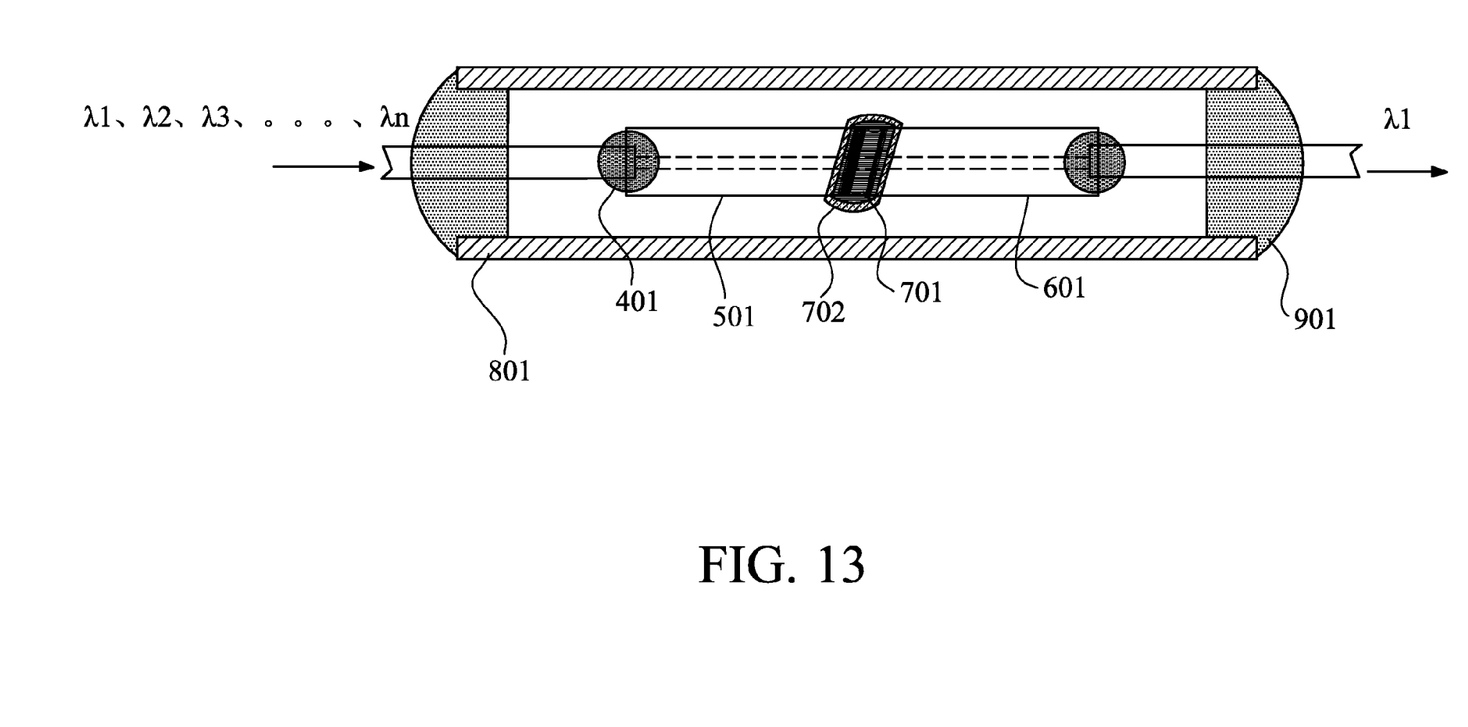
FIG. 13 is a schematic view of the assembled light conductor tubes connected to a metallic outside tube.

In FIG. 12, a metallic outside tube 801 is jacketed outside of the connected first and second light conductor tubes 501 and 601. Due to the inner diameter of the metallic outside tube 801 being greater than the outer diameters of the first and second light conductor tubes 501 and 601, i.e., the metallic outside tube 801 is directly jacketed onto the connected first and second light conductor tubes 501 and 601, a second adhesive must be dot-wisedly applied between the metallic outside tube 801 and the first and second light conductor tubes 501 and 601. In FIG. 13, when the required coaxial degree of the of the metallic outside tube 801 and the first and second light conductor tubes 501 and 601 is relatively completed, the second adhesive is dot-wisedly applied between two ports of the metallic outside tube 801 and the first and second light conductor tubes 501 and 601. In this embodiment, the second adhesive is silicone glue providing excellent moisture resistance and flexibility to absorb vibrations, and the metallic outside tube 801 is a steel pipe.

According to the embodiment, the filter device is simply composed of three elements: the first light conductor tube 501 for light input, the second light conductor tube 601 for light output, and the metallic outside tube 801. In comparison to the conventional filter, the filter device of the embodiment provides a smaller sized device by reducing parts and does not require welding process for connecting parts, so that the steps in the manufacturing process can be simplified and thermal damage caused by welding can be eliminated. Further, because the first and second light conductor tubes 501 and 601 are closely abutted with each other and aligned therebetween by the light-power meter, optical loss of the filter device of the embodiment can be eliminated.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A filter device, comprising:
   a first light conductor tube, comprising a first end for inputting light, a second end comprising a first slanted assembled end surface coated with a filter, a first capillary, and a first light conductor inserted into the first capillary;
   a second light conductor tube, comprising a third end for inputting light, a fourth end comprising a second slanted assembled end surface, a second capillary, and a second light conductor inserted into the second capillary, wherein the second slanted assembled end surface of the fourth end is disposed next to and parallel to the first slanted assembled end surface of the second end of the first light conductor tube to coaxially couple to the first light conductor tube; and
   an outside tube jacketed outside of the first and second light conductor tubes.

2. The filter device as claimed in claim 1, wherein the first and second light conductor tubes comprise optical fibers.

3. The filter device as claimed in claim 1, wherein the first and second light conductor tubes are adhered to each other by a first adhesive disposed at a conjunction region therebetween, and the first adhesive is applied to the peripheries of the first slanted assembled end surface of the first light conductor tube and the second assembled slanted end surface of the second light conductor tube.

4. The filter device as claimed in claim 3, wherein the first adhesive comprises UV glue.

5. The filter device as claimed in claim 3 further comprising a third adhesive applied to an outside layer of the conjunction region of the first and second light conductor tubes.

6. The filter device as claimed in claim 5, wherein the third adhesive outwardly applied to the outside layer of the conjunction region of the first and second light conductor tubes comprises thermosetting glue.

7. The filter device as claimed in claim 1, wherein the outside tube is outwardly adhered to the first and second light conductor tubes by a second adhesive.

8. The filter device as claimed in claim 7, wherein the second adhesive comprises silicone glue.

9. The filter device as claimed in claim 1, wherein the outside tube comprises a metallic outside tube.

10. The filter device as claimed in claim 1, wherein the second slanted assembled end surface of the second light conductor tube is coated with an anti-reflection coating.

11. A method for manufacturing a filter device, wherein the filter device comprises a first light conductor tube having a light-inputting end, a second light conductor tube having a light-outputting end and an outside tube, comprising the steps of:

(A) forming the first light conductor tube and grinding a first assembled end surface thereof into a first slanted surface coated with a filter;
   (B) forming the second light conductor tube and grinding a second assembled end surface thereof into a second slanted surface having a slanted angle equal to that of the first slanted surface of the first light conductor tube;
   (C) correspondingly adjusting the first assembled end surface of the first light conductor tube to the second assembled end surface of the second light conductor tube to adjust axiality of the first and second light conductor tubes;
   (D) bonding the first and second light conductor tubes by an adhesive; and
   (E) outwardly jacketing the outside tube to the first and second light conductor tubes.

12. The method for manufacturing the filter device as claimed in claim 11, wherein the step (B) further comprises a step of:
   coating an anti-reflection coating on the second assembled end surface of the second light conductor tube after the second assembled end surface of the second light conductor tube is grinded into the second slanted surface with the slanted angle.

13. The method for manufacturing the filter device as claimed in claim 11, wherein the adhesive in the step (D) is adhered to the peripheral of the first assembled end surface of the first light conductor tube and the second assembled end surface of the second light conductor tube.

14. The method for manufacturing the filter device as claimed in claim 13, wherein the adhesive comprises UV glue.

15. The method for manufacturing the filter device as claimed in claim 11 or 12, wherein the step (C) further comprises the steps of:

(C1) connecting the light-inputting end of the first light conductor tube to a light source and connecting the light-outputting end of the second light conductor tube to a light-power meter to adjust light wavelength generated by the light source to pass the filter;

(C2) placing the first and second light conductor tubes on a precise regulating seat and making the first assembled end surface of the first light conductor tube to face the second assembled end surface of the second light conductor tube; and (C3) aligning the first and second light conductor tubes by regulating the relative position therebetween to maximize light power of the light-power meter.

16. The method for manufacturing the filter device as claimed in claim 11, wherein the outside tube in the step (D) comprises a metallic outside tube.

17. The method for manufacturing the filter device as claimed in claim 11, wherein the slanted angle of the second slanted surface in the step (B) is 8 degrees.

18. The method for manufacturing the filter device as claimed in claim 11, wherein the step (E) further comprises the step of:

adhering the outside tube to the first and second light conductor tubes.

19. The method for manufacturing the filter device as claimed in claim 11 further comprising the step of:

(F) applying an adhesive to an outside layer of a conjunction region of the first and second light conductor tubes.

* * * * *